US012694735B2

(12) United States Patent
Singh

(10) Patent No.: US 12,694,735 B2
(45) Date of Patent: ***Jul. 28, 2026

(54) MOBILE DEVICE REQUIRING IDENTITY-RELATED INFORMATION TO UNLOCK A LOCK IN ONE OF TWO MODES FOR UNLOCKING THE LOCK

(71) Applicant: Dauntless Labs, LLC, Austin, TX (US)

(72) Inventor: Ranjeev K. Singh, Austin, TX (US)

(73) Assignee: Dauntless Labs, LLC, Austin, TX (US)

( * ) Notice: Subject to any disclaimer, the term of this patent is extended or adjusted under 35 U.S.C. 154(b) by 249 days.

This patent is subject to a terminal disclaimer.

(21) Appl. No.: 18/395,095

(22) Filed: Dec. 22, 2023

(65) Prior Publication Data

US 2024/0127648 A1    Apr. 18, 2024

Related U.S. Application Data

(63) Continuation of application No. 17/487,726, filed on Sep. 28, 2021, now Pat. No. 11,861,946, which is a continuation of application No. 17/034,587, filed on Sep. 28, 2020, now Pat. No. 11,776,336, which is a continuation of application No. 16/225,006, filed on Dec. 19, 2018, now Pat. No. 10,825,275.

(51) Int. Cl.
| | |
|---|---|
| *G07C 9/00* | (2020.01) |
| *G06F 16/18* | (2019.01) |
| *H04L 9/06* | (2006.01) |
| *H04L 9/32* | (2006.01) |
| *H04W 4/02* | (2018.01) |
| *H04W 12/63* | (2021.01) |
| *H04L 9/00* | (2022.01) |

(52) U.S. Cl.
CPC ..... *G07C 9/00563* (2013.01); *G06F 16/1805* (2019.01); *G07C 9/00309* (2013.01); *H04L 9/0643* (2013.01); *H04L 9/3247* (2013.01); *H04W 4/025* (2013.01); *H04W 12/63* (2021.01); *H04L 9/50* (2022.05)

(58) Field of Classification Search
None
See application file for complete search history.

(56) References Cited

U.S. PATENT DOCUMENTS

| | | | | |
|---|---|---|---|---|
| 6,957,337 | B1* | 10/2005 | Chainer | ................. G06F 21/31 |
| | | | | 713/168 |
| 2018/0005241 | A1* | 1/2018 | Smothers | ............... G06Q 30/06 |
| 2019/0188817 | A1* | 6/2019 | Yanagida | ......... G06Q 10/06311 |
| 2021/0090364 | A1* | 3/2021 | Lee | ....................... H04W 12/08 |

* cited by examiner

*Primary Examiner* — Piotr Poltorak

(57) ABSTRACT

Devices and methods related to a mobile device requiring identity-related information to unlock a lock in one of two modes for unlocking the lock are described. A current state of the lock can be changed based on an exchange of information, via a wireless interface, between a mobile device and the lock. The exchange of information includes a use of a sharable digital key associated with at least one of a set of persons authorized to change a state of the lock. The exchange of information is configurable to operate in a first mode or a second mode. In the first mode, no identity-related information from at least one set of persons attempting to change the state of the lock to is required. In the second mode, identity-related information from at least one of a set of persons attempting to change the state of the lock is required.

22 Claims, 8 Drawing Sheets

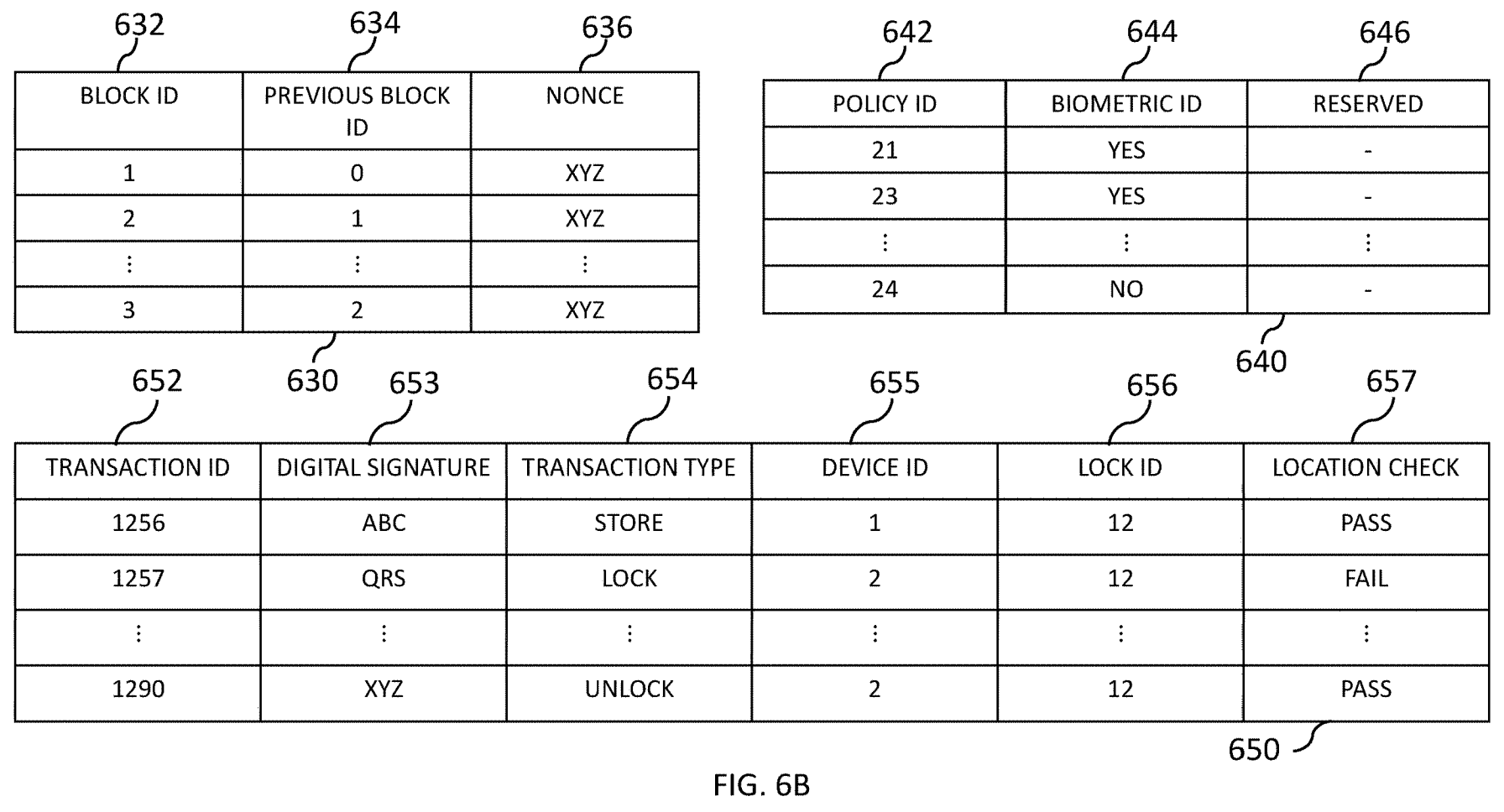

640

| POLICY ID | BIOMETRIC ID | RESERVED |
|-----------|--------------|----------|
| 642 | 644 | 646 |
| 21 | YES | - |
| 23 | YES | - |
| ... | ... | ... |
| 24 | NO | - |

630

| BLOCK ID | PREVIOUS BLOCK ID | NONCE |
|----------|-------------------|-------|
| 632 | 634 | 636 |
| 1 | 0 | XYZ |
| 2 | 1 | XYZ |
| ... | ... | ... |
| 3 | 2 | XYZ |

650

| TRANSACTION ID | DIGITAL SIGNATURE | TRANSACTION TYPE | DEVICE ID | LOCK ID | LOCATION CHECK |
|----------------|-------------------|------------------|-----------|---------|----------------|
| 652 | 653 | 654 | 655 | 656 | 657 |
| 1256 | ABC | STORE | 1 | 12 | PASS |
| 1257 | QRS | LOCK | 2 | 12 | FAIL |
| ... | ... | ... | ... | ... | ... |
| 1290 | XYZ | UNLOCK | 2 | 12 | PASS |

FIG. 6B

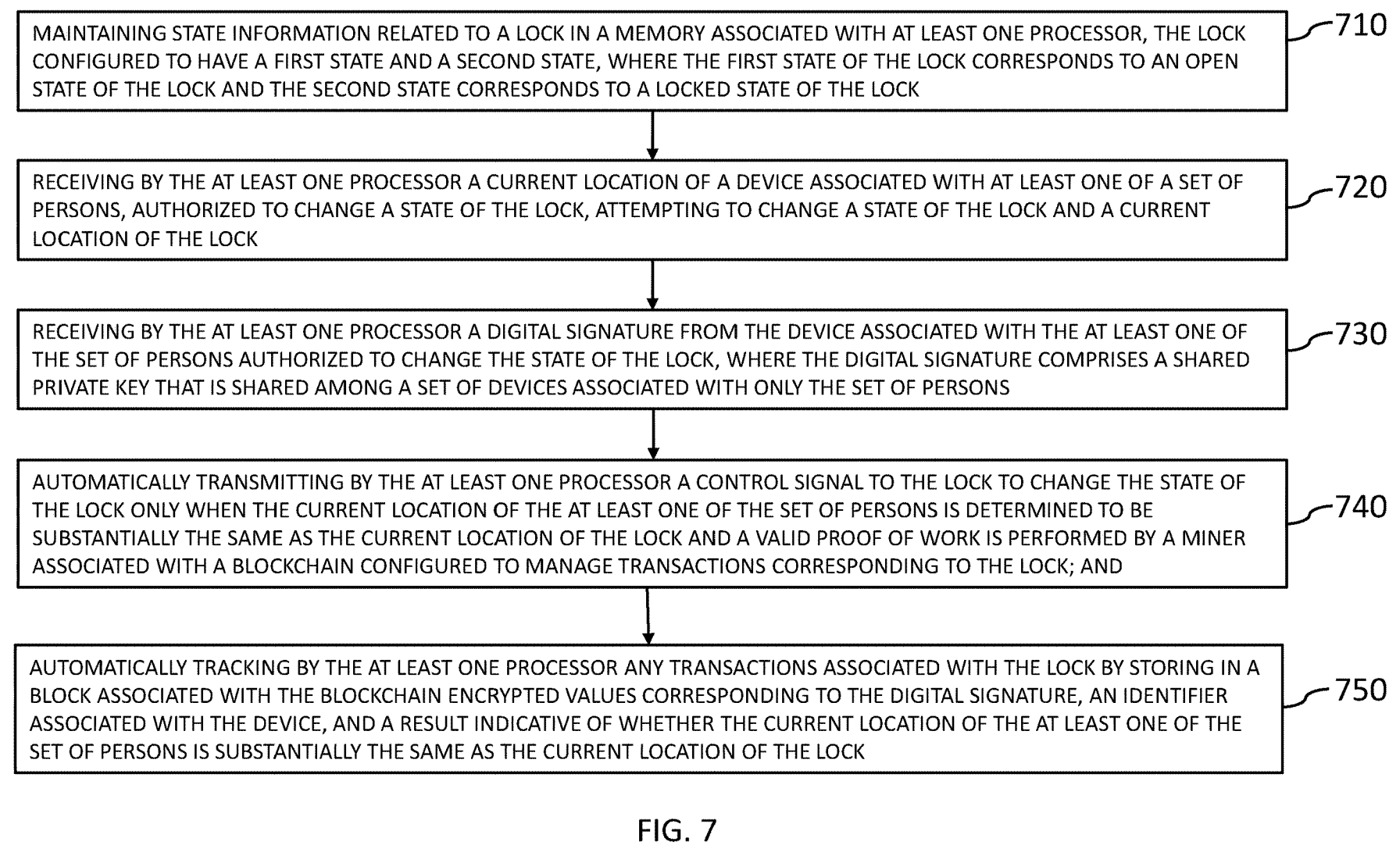

710 — MAINTAINING STATE INFORMATION RELATED TO A LOCK IN A MEMORY ASSOCIATED WITH AT LEAST ONE PROCESSOR, THE LOCK CONFIGURED TO HAVE A FIRST STATE AND A SECOND STATE, WHERE THE FIRST STATE OF THE LOCK CORRESPONDS TO AN OPEN STATE OF THE LOCK AND THE SECOND STATE CORRESPONDS TO A LOCKED STATE OF THE LOCK

720 — RECEIVING BY THE AT LEAST ONE PROCESSOR A CURRENT LOCATION OF A DEVICE ASSOCIATED WITH AT LEAST ONE OF A SET OF PERSONS, AUTHORIZED TO CHANGE A STATE OF THE LOCK, ATTEMPTING TO CHANGE A STATE OF THE LOCK AND A CURRENT LOCATION OF THE LOCK

730 — RECEIVING BY THE AT LEAST ONE PROCESSOR A DIGITAL SIGNATURE FROM THE DEVICE ASSOCIATED WITH THE AT LEAST ONE OF THE SET OF PERSONS AUTHORIZED TO CHANGE THE STATE OF THE LOCK, WHERE THE DIGITAL SIGNATURE COMPRISES A SHARED PRIVATE KEY THAT IS SHARED AMONG A SET OF DEVICES ASSOCIATED WITH ONLY THE SET OF PERSONS

740 — AUTOMATICALLY TRANSMITTING BY THE AT LEAST ONE PROCESSOR A CONTROL SIGNAL TO THE LOCK TO CHANGE THE STATE OF THE LOCK ONLY WHEN THE CURRENT LOCATION OF THE AT LEAST ONE OF THE SET OF PERSONS IS DETERMINED TO BE SUBSTANTIALLY THE SAME AS THE CURRENT LOCATION OF THE LOCK AND A VALID PROOF OF WORK IS PERFORMED BY A MINER ASSOCIATED WITH A BLOCKCHAIN CONFIGURED TO MANAGE TRANSACTIONS CORRESPONDING TO THE LOCK; AND

750 — AUTOMATICALLY TRACKING BY THE AT LEAST ONE PROCESSOR ANY TRANSACTIONS ASSOCIATED WITH THE LOCK BY STORING IN A BLOCK ASSOCIATED WITH THE BLOCKCHAIN ENCRYPTED VALUES CORRESPONDING TO THE DIGITAL SIGNATURE, AN IDENTIFIER ASSOCIATED WITH THE DEVICE, AND A RESULT INDICATIVE OF WHETHER THE CURRENT LOCATION OF THE AT LEAST ONE OF THE SET OF PERSONS IS SUBSTANTIALLY THE SAME AS THE CURRENT LOCATION OF THE LOCK

FIG. 7

MOBILE DEVICE REQUIRING IDENTITY-RELATED INFORMATION TO UNLOCK A LOCK IN ONE OF TWO MODES FOR UNLOCKING THE LOCK

CROSS-REFERENCE TO A RELATED APPLICATION

This application is a continuation of U.S. application Ser. No. 17/487,726, filed Sep. 28, 2021, titled "LOCKING SYSTEM WITH A LOCK OPERABLE IN DIFFERENT MODES FOR ALLOWING ACCESS USING A SHARABLE DIGITAL KEY," which is a continuation of U.S. application Ser. No. 17/034,587, filed Sep. 28, 2020, titled "AUTOMOBILE WITH A LOCK FOR PROVIDING CONTACTLESS SECURE ACCESS TO THE AUTOMOBILE," now issued as U.S. Pat. No. 11,776,336, which is a continuation of U.S. application Ser. No. 16/225,006, filed Dec. 19, 2018, titled "BLOCKCHAIN-CONTROLLED AND LOCATION-VALIDATED LOCKING SYSTEMS AND METHODS," now issued U.S. Pat. No. 10,825,275, the entire contents of each of which are hereby incorporated herein by reference.

BACKGROUND

Locks, such as the locks used with dwellings and the locks used with automobiles, provide a way to securely access the dwellings and the automobiles. While locks have become more secure over time, electronically controlled locks remain susceptible to unauthorized access.

Thus, there is a need for blockchain-controlled and location-validated locking systems and methods.

SUMMARY

In one example, the present disclosure relates to a method implemented by at least one processor. The method may include maintaining state information related to a lock in a memory associated with at least one processor, the lock configured to have a first state and a second state, where the first state of the lock corresponds to an open state of the lock and the second state corresponds to a locked state of the lock. The method may further include receiving by the at least one processor a current location of a device associated with at least one of a set of persons, authorized to change a state of the lock, attempting to change a state of the lock and a current location of the lock. The method may further include receiving by the at least one processor a digital signature from the device associated with the at least one of the set of persons authorized to change the state of the lock, where the digital signature comprises a shared private key that is shared among a set of devices associated with only the set of persons. The method may further include automatically transmitting by the at least one processor a control signal to the lock to change the state of the lock only when the current location of the at least one of the set of persons is determined to be substantially the same as the current location of the lock and a valid proof of work is performed by a miner associated with a blockchain configured to manage transactions corresponding to the lock. The method may further include automatically tracking by the at least one processor any transactions associated with the lock by storing in a block associated with the blockchain encrypted values corresponding to the digital signature, an identifier associated with the device, and a result indicative of whether the current location of the at least one of the set of persons is substantially the same as the current location of the lock.

In another example, the present disclosure relates to a system comprising at least one processor and a memory. The system may further include the one or more modules stored in the memory and configured for execution by the at least one processor. The one or more modules may include instructions: (1) to maintain state information related to a lock in a memory associated with at least one processor, the lock configured to have a first state and a second state, where the first state of the lock corresponds to an open state of the lock and the second state corresponds to a locked state of the lock, (2) to receive a current location of a device associated with at least one of a set of persons, authorized to change a state of the lock, attempting to change a state of the lock and a current location of the lock, (3) to receive a digital signature from the device associated with the at least one of the set of persons authorized to change the state of the lock, where the digital signature comprises a shared private key that is shared among a set of devices associated with only the set of persons, (4) to automatically transmit a control signal to the lock to change the state of the lock only when the current location of the at least one of the set of persons is determined to be substantially the same as the current location of the lock and a valid proof of work is performed by a miner associated with a blockchain configured to manage transactions corresponding to the lock, and (5) to automatically track any transactions associated with the lock by storing in a block associated with the blockchain encrypted values corresponding to the digital signature, an identifier associated with the device, and a result indicative of whether the current location of the at least one of the set of persons is substantially the same as the current location of the lock.

In yet another example, the present disclosure relates to a non-transitory computer readable medium comprising instructions corresponding to a method implemented by at least one processor. The method may include maintaining state information related to a lock in a memory associated with at least one processor, the lock configured to have a first state and a second state, where the first state of the lock corresponds to an open state of the lock and the second state corresponds to a locked state of the lock. The method may further include receiving by the at least one processor a current location of a device associated with at least one of a set of persons, authorized to change a state of the lock, attempting to change a state of the lock and a current location of the lock. The method may further include receiving by the at least one processor a digital signature from the device associated with the at least one of the set of persons authorized to change the state of the lock, where the digital signature comprises a shared private key that is shared among a set of devices associated with only the set of persons. The method may further include automatically transmitting by the at least one processor a control signal to the lock to change the state of the lock only when the current location of the at least one of the set of persons is determined to be substantially the same as the current location of the lock and a valid proof of work is performed by a miner associated with a blockchain configured to manage transactions corresponding to the lock. The method may further include automatically tracking by the at least one processor any transactions associated with the lock by storing in a block associated with the blockchain encrypted values corresponding to the digital signature, an identifier associated with the device, and a result indicative of whether the current location of the at least one of the set of persons is substantially the same as the current location of the lock.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIGS. 6A-6B show the structure of the blockchain for the blockchain-controlled and location-validated locking system in accordance with one example; and FIG. 7 shows a flow chart of a method for the blockchain-controlled and location-validated locking system in accordance with one example.

DETAILED DESCRIPTION

Examples described in this disclosure relate to blockchain-controlled and location-validated locking systems and methods. In certain examples, the locking system may include at least one lock for use with a structure for use as an office, a home, a hotel, a retail location, or another structure that may require a lock. In certain other examples, the locking system may include at least one lock for use with a automobile. In certain other examples, the locking system may include at least one lock for use with anything that requires a lock, such as a container, a portable box, or any other thing.

Figure 1:
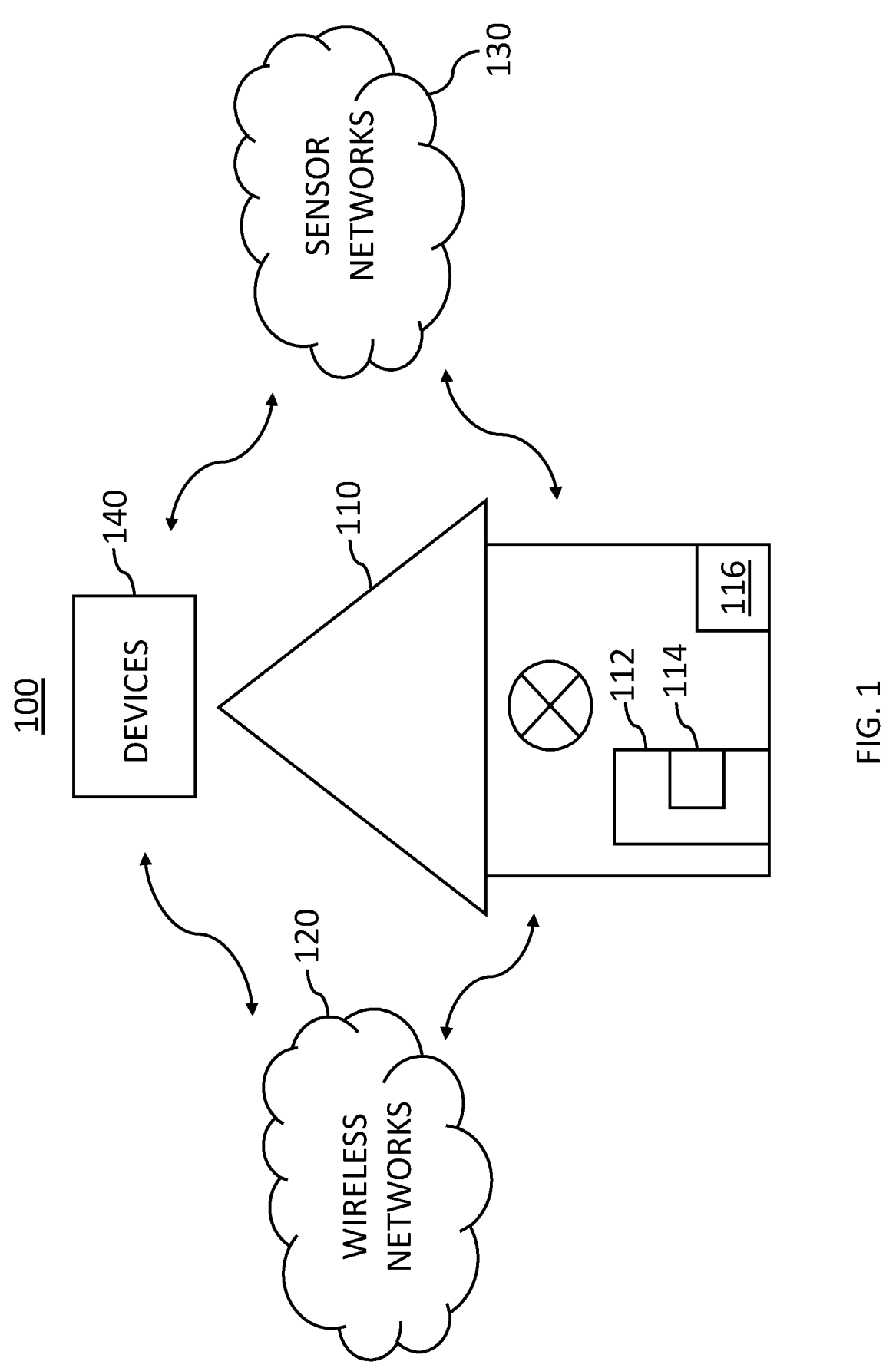
FIG. 1 shows a diagram of a system environment 100 for a blockchain-controlled and location-validated locking system in accordance with one example.

FIG. 1 shows a diagram of a system environment 100 for a blockchain-controlled and location-validated locking system in accordance with one example. System environment 100 may include a structure 110 that may have an opening 112 (e.g., a door) having a lock 114. Structure 110 may further include a locking system 116. Lock 114 and locking system 116 may communicate with devices 140 via wireless networks 120 and sensor networks 130. Lock 114 may be any type of lock usable with a structure that requires locking and may include a controller, at least one wireless transceiver, and a certain amount of storage in the form of a volatile or a non-volatile memory. Locking system 116 may include at least a miner described later. Wireless networks 120 may include cellular networks, Wi-Fi networks, Personal Area Networks, such as Bluetooth, or other types of wireless networks. Wireless networks 120 may include not only communication apparatuses, such as cell sites, but also cloud computing infrastructure. The cloud computing infrastructure may be used to provide additional computing and storage functionality to any one of devices 140, lock 114, and locking system 116. Sensor networks 130 may allow devices 140 to engage in machine-to-machine communication with each other and with lock 114 and locking system 116.

While FIG. 1 shows separate sensor networks 130, the functionality related to these networks may be included in wireless networks 120. Via wireless networks 120, and as needed, via sensor networks 130, devices 140 may also communicate with additional smart devices either worn by a user of devices 140 or carried by the user. As an example, the user may have smart glasses, a wearable electronics device, or smart footwear on their person. Each of these devices may have the same or similar functionality and modules as described for devices 140. Thus, for example, a wearable electronics device may be part of the clothing worn by the user and that might be the only device on the user's person and still provide all or most of the functions related to one of devices 140. In addition, while FIG. 1 describes lock 114 and locking system 116 for use with a dwelling like structure, lock 114 and locking system 116 may be used with other structures (e.g., a hotel or a retail location) or an automobile or any other thing (e.g., a container) that requires a lock and a locking system.

Figure 2:
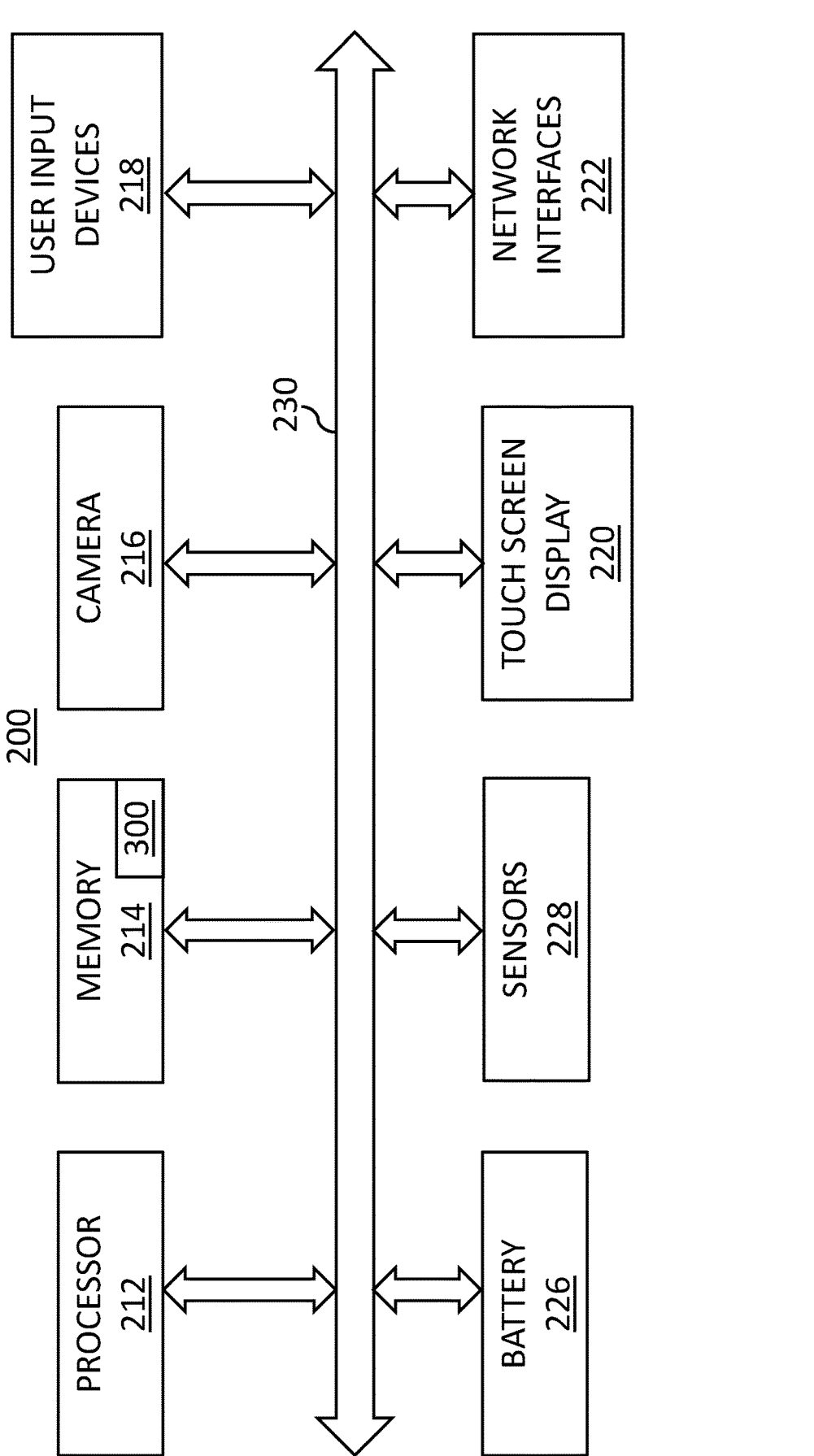
FIG. 2 shows a block diagram of a device for locking or unlocking a lock associated with the locking system in accordance with one example.

FIG. 2 shows a block diagram of a device 200 for locking or unlocking a lock (e.g., lock 114 of FIG. 1) associated with the locking system (e.g., locking system 116 of FIG. 1) in accordance with one example. Without limitations, such a device may be any device that can be carried by a person, such as a handheld device or a wearable device. In one embodiment, device 200 may include a processor 212, a memory 214, a camera 216, and user input devices 218, a touch screen display 220, network interfaces 222, a battery 226, and sensors 228. Each of these components may be connected to each other (as needed for the functionality of device 200) via a bus system 230. Exemplary devices include a smartphone, such as an iPhone, a smart watch, or any other device that an individual may have on their person, including smart eyeglasses, shoes, or other wearable devices. Processor 212 may execute instructions stored in memory 214. Camera 216 may capture both still and moving images. Camera 216 may also provide machine vision in conjunction with artificial intelligence (e.g., image recognition and image classification). User input devices include haptic devices, such as keyboards or buttons, and touch screens. Touch screen display 220 may be any type of display, such as LCD, LED, or other types of display. As an example, touch screen display 220 may be a capacitive touch screen. The touch screen (e.g., display 220) can detect touch events, such as tapping on the screen or swiping on the screen. In response to such events, touch image data may be generated and submitted to processor 212. Network interfaces 222 may include communication interfaces, such as cellular radio, Bluetooth radio, UWB radio, or other types of wireless or wired communication interfaces. Sensors 228 may include a variety of sensors, such as accelerometers, gyroscopes, GPS, and proximity sensors. Battery 226 may be any portable battery, such as a chargeable lithium-ion battery. Although FIG. 2 shows a specific number of components arranged in a certain manner, device 200 may include additional or fewer components arranged differently.

Figure 3:
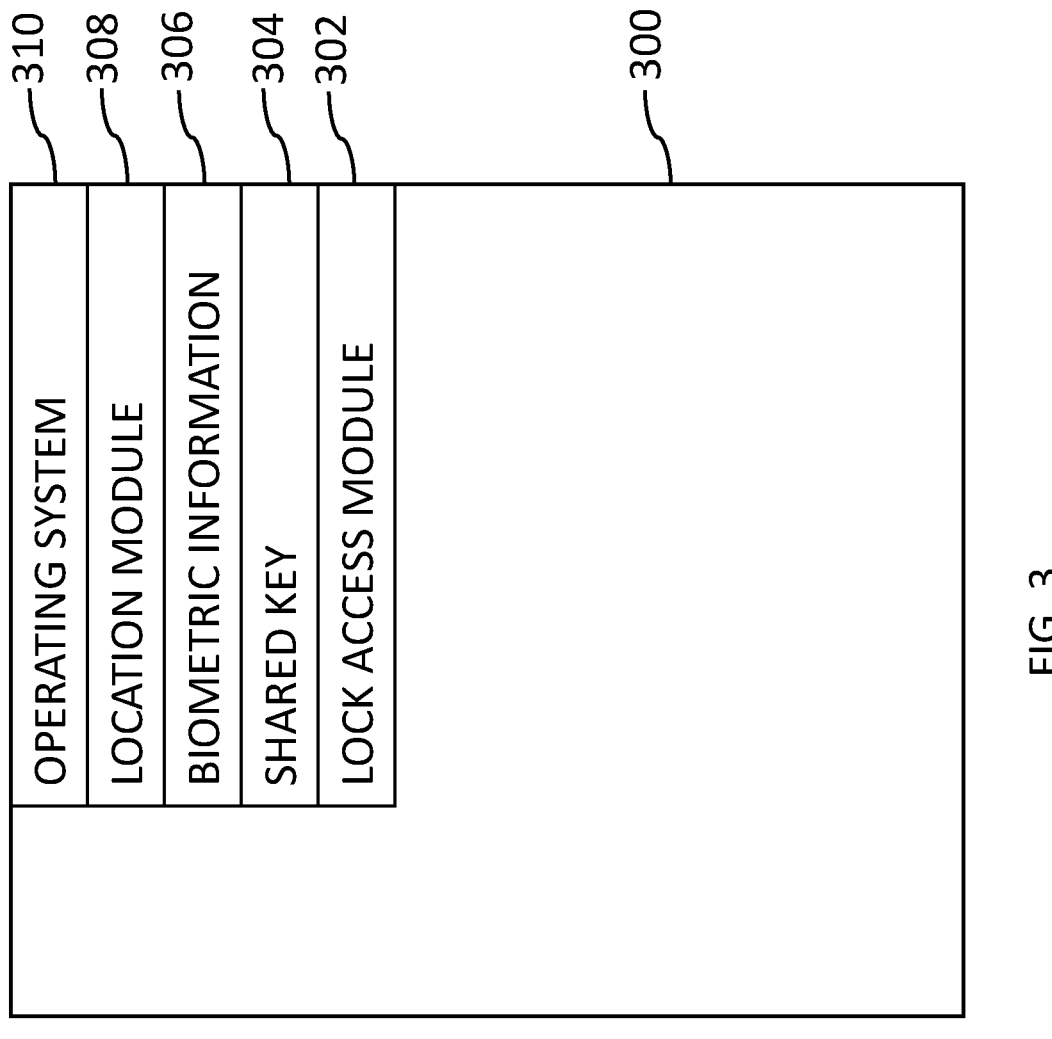
FIG. 3 is a block diagram showing the various modules associated with the device of FIG. 2 in accordance with one example.

FIG. 3 is a block diagram showing the various modules associated with the device of FIG. 2 in accordance with one example. In one embodiment, these modules may be stored in memory 214 of device 200 and may contain software instructions that when executed by processor 212 of device 200 may provide the functionality associated with these modules. In one embodiment, some or all of these modules may be a part of a downloadable application from the Internet; as an example, from Apple's iTunes store or Google's Google Play store. Exemplary modules 300 stored in memory may include a lock access module 302, a shared key 304, biometric information 306, a location module 308, and an operating system 310.

Lock access module 302 may include instructions that when executed by processor 212 may result in generating a request from a user of device 200 to change a state of a lock (e.g., lock 114 of FIG. 1). The request may be to change the state of the lock from an open state to a closed state or vice-versa. In one example, the request may be implicit. Thus, the state of a lock may change without the lock receiving an explicit instruction to change. As an example, a processor and instructions associated with the locking system may change the state of the lock without receiving an explicit request to change the state of the lock. In one example, this may occur when the locking system automatically determines the occurrence of an event that requires a change in the state of the lock. Such an event may simply be device 200 leaving an area proximate to the locking system. Such automatic locking events may be specified and programmed to occur by executing instructions associated with the locking system. Another example of an automatic event may be a recognition by the locking system that the person attempting to open the lock or present proximate to the lock has already been granted access privileges to open the lock and the locking system need not receive an explicit request to change a state of the lock.

Shared key 304 may be a public or private key provided by a controller associated with a blockchain for managing the lock. In one example, shared key 304 may be distributed by a miner (described in more detail later) to a set of devices (e.g., a form of a device 140) associated with the person authorized to operate the lock. Thus, a homeowner, a business owner, a renter, a maintenance person, or another person with an authority to operate the lock may have one or more devices that may receive shared key 304 from the miner. The distribution of the shared key may require the device and the person to be authenticated at least once. In another example, the device and the person may need to be authenticated each time a request to change a state of the lock is made.

Biometric information 306 may include face ID, fingerprints, iris scans, voice input, or other forms of biometrics that may be used to provide another layer of security beyond shared key 304. Thus, in one example, a person's biometric information may be stored in memory 214 for use with the blockchain-controlled and location-validated locking system. In one example, biometric information 306 may include an electrical property associated with the person attempting to open the lock. Examples of the electrical property include an inductance, a capacitance, a resistance, or a combination of these electrical properties. Any of these electrical properties could be measured when the lock is calibrated. In addition, any of these electrical properties may be captured based on known relationships between voltage/current, resistance, capacitance, or inductance of the object of measurement.

In one example, a current flow may be created between the lock (or a specific portion of a structure that is locked) and the device being used to open the lock via the body of the person attempting to open the lock. That current flow may be calibrated and stored as biometric information 306. Alternatively, as explained above, any of the other electrical properties related to current flow may instead be stored as biometric information 306. In one example, electromagnetic waves having a certain frequency (e.g., approximately 10 MHz) may be coupled to the body of the person via a capacitive coupling between the person's skin and the surface of a lock or a structure encompassing the lock. The electromagnetic waves may be generated using a radio configured to transmit these waves at a certain frequency. In one example, the electromagnetic waves may be amplitude modulated such that a logical one bit may be represented by a presence of an electromagnetic signal and a logical zero bit may be represented by an absence of the electromagnetic signal. The receiver (e.g., device 200) may receive the electromagnetic waves and measure any potential generated by the electromagnetic waves as they travel through the large capacitance associated with the human body. At the time of the installation of the lock, this potential may be calibrated for a specific person or a set of persons that need to access the lock. The calibrated potential may be stored as biometric information 306. While the example described herein uses capacitive coupling, electromagnetic signals may be coupled via galvanic coupling or magnetic coupling.

In one example, biometric information 306 obtained via the aforementioned process may not be used to identify the person or the person attempting to change a state of the lock. Instead, biometric information 306 may simply be used to confirm that a person is attempting to change the state of the lock. This may prevent unauthorized hacking of the lock where a hacker may maliciously provide information concerning the location of the person attempting to unlock the lock, but the absence of biometric information 306 may indicate that no person is attempting to change a state of the lock. While this may remove the ability to operate the lock remotely, it will increase the level of security. To further prevent the malicious hacking of the lock, as explained earlier, the electrical property may be calibrated and a range of values of the electrical property or a specific value of the electrical property may be stored as biometric information 306. This may advantageously further lower the chances of a malicious hack of the lock.

In addition, as described herein, the electrical property may further include electromechanical properties detected using MEMS sensors or other sensors. As an example, when a lock requires a user to turn a knob or a handle, the torque or a similar force received by the lock may be measured using a sensor (e.g., a MEMS sensor). The measured force may be calibrated and stored as part of the electrical property associated with the lock. Instead of the force, other mechanical or electromechanical aspects may be included as part of the electrical property. As an example, a displacement of the door knob or the handle may instead be calibrated and stored as part of the electrical property. In general, any mechanical or electromechanical measure that is largely unaffected by the history of previous measurements could be used as part of the electrical property.

Location module 308 may include instructions that when executed by processor 212 may result in location module 308 obtaining a location of a device associated with an authorized person via a sensor (e.g., GPS) or via another way. Location module 308 may format the location information and transmit the location information to the miner associated with the blockchain. Alternatively, the location information may be transmitted to another controller associated with the lock and the lock may then transmit the location information to the miner.

Operating system 310 may include instructions to enable the operation of device 200 including allowing the other modules to access hardware components, including processor 212, memory 214, and sensors 228. Operating system 310 may be the Android operating system, the iOS operating system, or any other such operating system. Although FIG. 3 shows a certain number of modules 300, the functionality associated with these modules may be combined or separated. Thus, memory 214 may include fewer or more modules. In addition, some of these modules or a portion of the instructions corresponding to these modules may be executed on processors located in a remote data center.

Figure 4:
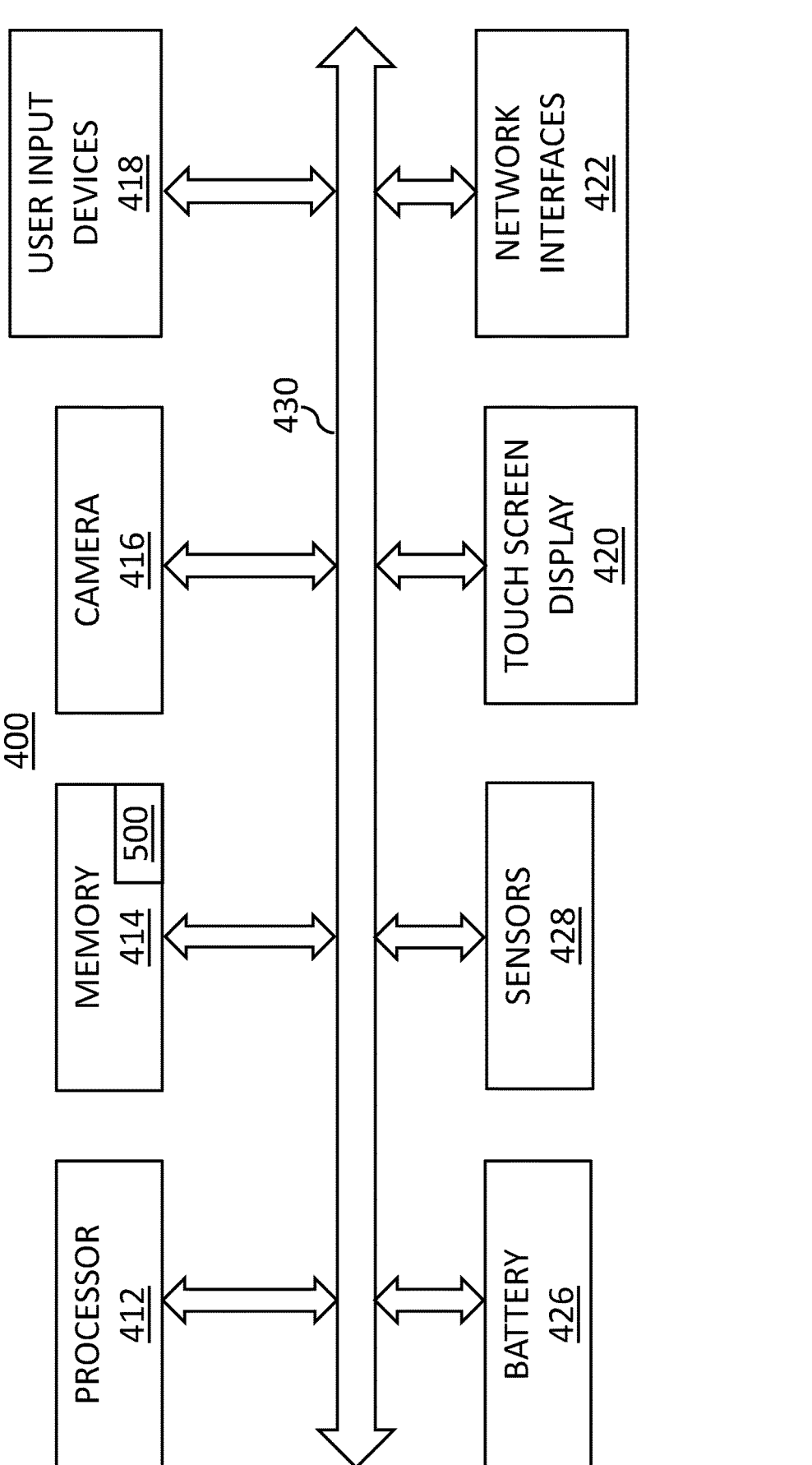
FIG. 4 is a block diagram of a miner for a blockchain-controlled and location-validated locking system in accordance with one example.

FIG. 4 is a block diagram of a miner 400 for a blockchain-controlled and location-validated locking system in accordance with one example. In one embodiment, miner 400 may include a processor 412, memory 414, camera 416, and user input devices 418, touch screen display 420, network interfaces 422, battery 426, and sensors 428. Each of these components may be connected to each other (as needed for the functionality of miner 400) via a bus system 430. Processor 412 may execute instructions stored in memory 414. In one example, memory 414 may include both volatile and non-volatile memory. When memory 414 includes non-volatile memory, in one example, the blocks corresponding to the block chain may be stored by miner 400 in the non-volatile portion of memory 414. In one example, the non-volatile memory portion may be configured such that once a block is stored in memory 414, it cannot be over-written by miner 400 or any other processor or controller. This may ensure that blocks are not tampered with by malicious actors or by mistake. Camera 416 may capture both still and moving images. Camera 416 may also provide machine vision in conjunction with artificial intelligence (e.g., image recognition and image classification). User input devices include haptic devices, such as keyboards or buttons, and touch screens. Touch screen display 420 may be any type of display, such as LCD, LED, or other types of display. As an example, touch screen display 420 may be a capacitive touch screen. The touch screen (e.g., display 420) can detect touch events, such as tapping on the screen or swiping on the screen. In response to such events, touch image data may be generated and submitted to processor 412. Network interfaces 422 may include communication interfaces, such as cellular radio, Bluetooth radio, UWB radio, or other types of wireless or wired communication interfaces. Sensors 428 may include a variety of sensors, such as accelerometers, gyroscopes, GPS, and proximity sensors. Battery 426 may be any portable battery, such as a chargeable lithium-ion battery. Although FIG. 4 shows a specific number of components arranged in a certain manner, miner 400 may include additional or fewer components arranged differently.

Figure 5:
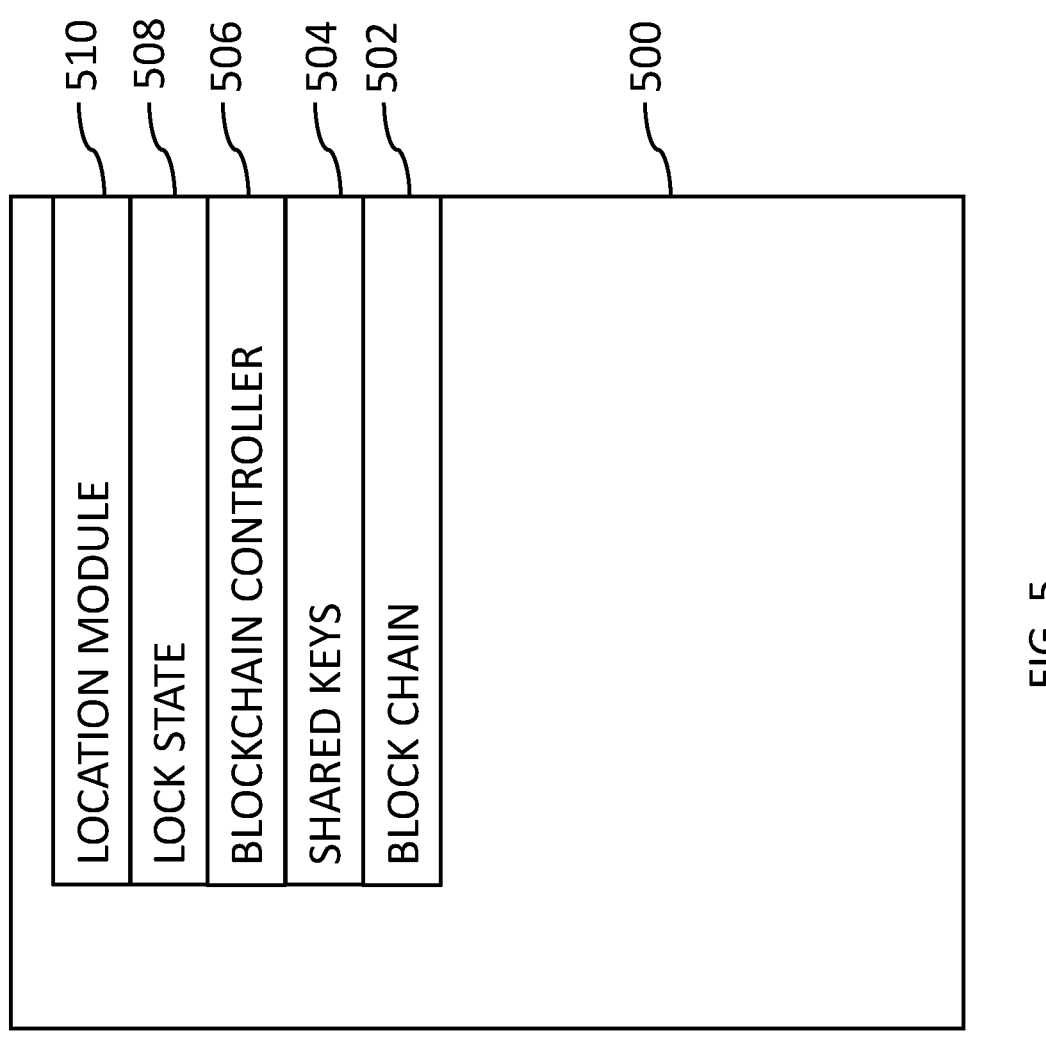
FIG. 5 is a block diagram showing the various modules associated with the miner of FIG. 4 in accordance with one example.

FIG. 5 is a block diagram showing the various modules 500 associated with the miner 400 of FIG. 4 in accordance with one example. In one embodiment, these modules may be stored in memory 414 of miner 400 and may contain software instructions that when executed by processor 412 of miner 400 may provide the functionality associated with these modules. Exemplary modules 500 stored in memory 414 may include blockchain 502, shared keys 504, blockchain controller 506, lock state 508, and location module 510.

Blockchain 502, described more in detail later, may include blocks that are chained together such that it is an ordered set of blocks with the more recent blocks near the head of blockchain 502 and older blocks near the tail of blockchain 502.

Shared keys 504 may be public or private keys provided by a controller (blockchain controller 506) associated with blockchain 502 for managing the lock (e.g., lock 114 of FIG. 1). In one example, shared keys 504 may be distributed by blockchain controller 506 to a set of devices (e.g., devices 140) associated with the person(s) authorized to operate the lock. Thus, a homeowner, a business owner, a renter, a maintenance person, or another person with an authority to operate the lock may have one or more devices that may receive one of the shared keys 504 from miner 400. The distribution of the shared keys may require the device and the person to be authenticated at least once.

Blockchain controller 506 may include instructions that when executed by processor 412 may result in providing functions associated with managing blockchain 502. Additional details of blockchain controller 506 are provided in relation to the description of an example structure of a blockchain for use with the blockchain-controlled and location-validated locking system and the associated methods.

Lock state 508 may be a set of records (e.g., a set of database records) to keep track of a state of each of the locks managed using blockchain controller 506. As an example, lock state 508 may include a record for keeping track of a state of lock 114 of FIG. 1.

Location module 510 may include instructions that when executed by processor 412 may result in location module 510 obtaining a location of the lock (e.g., lock 114 of FIG. 1) associated with a structure (e.g., structure 110 of FIG. 1) via a sensor (e.g., GPS) or via another way. Location module 510 may format the location information and provide the location information to blockchain controller 506 associated with blockchain 502. Alternatively, the location information may be transmitted to another controller associated with the lock and the lock may then transmit the location information to the blockchain controller.

Figure 6A:
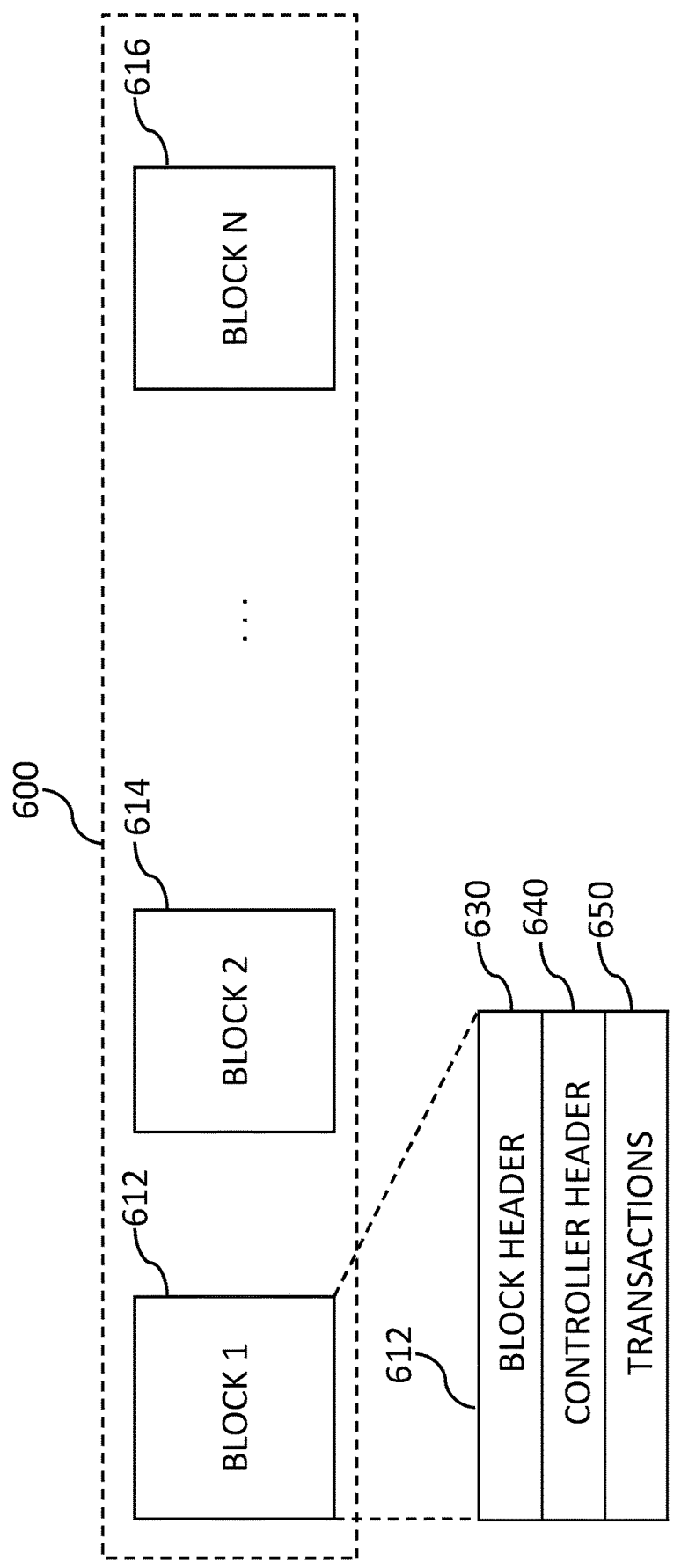

FIGS. 6A-6B show the structure of a blockchain 600 for the blockchain-controlled and location-validated locking system in accordance with one example. In this example, blockchain 600 may include N blocks (e.g., Block 1 612, Block 2 614, . . . Block N 616). Blockchain 600 may correspond to blockchain 502 that is stored, in this example, in memory 500 associated with miner 400. Each block may include information regarding the headers and transactions corresponding to a particular lock or a set of locks. As an example, block 1 612 may include a block header 630, a controller header 640, and transactions 650. Although FIG. 6A shows a certain structure of a blockchain including a certain arrangement of blocks, the blockchain may have a different structure and it may include additional or fewer blocks.

Referring now to FIG. 6B, in this example, block header 630 may include three columns, including a column labeled block ID 632, a second column labeled previous block ID 634, and a third column labeled nonce 636. Block ID 632 may be used by blockchain controller 506 to keep track of individual blocks or groups of blocks. Previous block ID 634 may be used by blockchain controller 506 to chain blocks; thus, each block may identify a previous block or a set of previous blocks. Nonce 636 may represent a proof of work performed by a miner (e.g., miner 400). In one example, nonce 636 may be a resource consuming cryptographic puzzle. Blockchain controller 506 may evaluate nonce 636 to determine whether valid proof of work has been performed by miner 400 or another miner. In one example, nonce may be a random number (e.g., a 32-bit number) and the proof of work may involve finding a hash below a target number. The target number may be selected to make it less or more difficult to find the target number.

Still referring to FIG. 6B, controller header 640 may include three columns, including a column labeled policy ID 642, a second column labeled biometric ID 644, and a third column labeled reserved 646. Policy ID 642 may be used to designate a policy in place for the lock or locks being managed by the blockchain. Thus, policy ID 642 may identify a policy or a set of policies in use. Each policy may further include information concerning the storage mechanism used (e.g., local storage or cloud storage) for the locks or the set of locks. Each policy may further include information regarding the lock or the set of locks, including information regarding the date/time the lock or the set of locks were put into operation and whether a particular lock or a set of locks is still operational. Biometric ID 644 may specify whether biometric identification is required to operate a lock or a set of locks. In addition, although not shown, biometric ID 644 may further be used to store the biometric information (e.g., face ID, iris scan, voice input, or an electrical property (as described earlier)) required of a person or a set of person requiring access to the lock. Reserved 646 is reserved for future use, where additional policy related information may be specified. As an example, a lock or as set of locks may have different operational requirements depending on whether the lock or the set of locks is being accessed from one country or another or from one state or another.

With continued reference to FIG. 6B, transactions 650 may include six columns, including a first column labeled transaction ID 652, a second column labeled digital signature 653, a third column labeled transaction type 654, a fourth column labeled device ID 655, a fifth column labeled lock ID 656, and a sixth column labeled location check 657. Transaction ID 652 may include an identifier for each transaction associated with a lock or a set of locks. Digital signature 653 may be used to store an encrypted version of a digital signature, e.g., a private key, a public key, or both provided by the device trying to perform a transaction (e.g., lock or unlock). Transaction type 654 may indicate the type of transaction, such as store a state of a lock, change a state of the lock to the locked state, or change a state of the lock to the unlocked state. Device ID 655 may include an encrypted version of an identifier associated with a device. Thus, each device that is authorized to access a lock or a set of locks may be assigned a unique identifier. Lock ID 656 may include an encrypted version of an identifier associated with a lock or a set of locks. Thus, each transaction may correspond to a lock or a set of locks. Location check 657 may include an encrypted version of a location check. Performing a location check may include comparing a location of the device with an assigned or automatically detected location of the device with an assigned or an automatically detected location of the lock. Thus, in one example, location check 657 may include an encrypted version of a result of whether the current location of the at least one of the set of persons authorized to operate the lock is determined to have substantially the same as the current location of the lock. In this example, the current location of the person may be determined by receiving location information from the device that the person is using to access the lock. As an example, the device being used to access the lock may be a smart phone or a smart watch and may have a GPS or another way to determine a location of the device, such that the device may communicate the location information to the lock. The lock may have an assigned location, or the lock may also have a GPS or another way to determine a location of the lock. In this context, the substantially the same location means that within measurement errors introduced by the GPS or another location measurement system (e.g., a cell tower-based triangulation system) the location is approximately the same. Although FIG. 6B shows a certain structure of a blockchain including a certain arrangement of blocks, the blockchain may have a different structure and it may include additional or fewer blocks. In addition, each of the blocks may include less or more information.

FIG. 7 shows a flow chart of a method for the blockchain-controlled and location-validated locking system in accordance with one example. As explained earlier a processor (e.g., processor 412 of FIG. 4) and corresponding instructions stored in a memory (e.g., memory 414) may perform the steps corresponding to the method. Alternatively, the processor may be distributed into multiple locations and the memory may also be distributed. Step 710 may include maintaining state information related to a lock in a memory associated with at least one processor, the lock configured to have a first state and a second state, where the first state of the lock corresponds to an open state of the lock and the second state corresponds to a locked state of the lock. Processor 412 associated with miner 400 may maintain a state of a lock or a state of a group of locks in memory 500 as lock state 508. Lock state 508 may include all of the information required to identify a lock (e.g., using a lock ID) and its current state.

Step 720 may include receiving by the at least one processor a current location of a device associated with at least one of a set of persons, authorized to change a state of the lock, attempting to change a state of the lock and a current location of the lock. Processor 414 associated with miner 400 may receive a current location of a device (e.g., device 200) associated with a person or a group of persons that is attempting to change a state of the lock or a group of locks. As described earlier, device 200 may provide location information based on a GPS sensor or other location detection techniques and communicate the location information to processor 414 associated with miner 400. In this example, the current location of the person may be determined by receiving location information from the device that the person is using to access the lock. As an example, the device being used to access the lock may be a smart phone or a smart watch and may have a GPS or another way to determine a location of the device, such that the device may communicate the location information to the lock. The lock may have an assigned location, or the lock may also have a GPS or another way to determine a location of the lock and transmit the location information to processor 412 associated with miner 400. As an example, the lock may include wireless transceivers coupled to at least one processor that may execute instructions stored in a memory. In this manner, the lock may determine its own current location (e.g., via a GPS sensor) and transmit the location (e.g., using the processor and the appropriate wireless transceiver) to processor 412 associated with miner 400.

Step 730 may include receiving by the at least one processor a digital signature from the device associated with the at least one of the set of persons authorized to change the state of the lock, where the digital signature comprises a shared private key that is shared among a set of devices associated with only the set of persons. In one example, processor 412 associated with miner 400 may receive the digital signature from device 200. The digital signature may include an encrypted version of a digital signature, e.g., a private key, a public key, or both provided by the device trying to perform a transaction (e.g., lock or unlock).

Step 740 may include automatically transmitting by the at least one processor a control signal to the lock to change the state of the lock only when the current location of the at least one of the set of persons is determined to be substantially the same as the current location of the lock and a valid proof of work is performed by a miner associated with a blockchain configured to manage transactions corresponding to the lock. In one example, processor 412 may transmit the control signal to the lock after comparing the location of the lock and the location of the person attempting to change a state of the lock. As explained earlier, nonce 636 (FIG. 6B) may represent a proof of work performed by a miner (e.g., miner 400) associated with a blockchain configured to manage the transactions corresponding to the lock or the set of locks. In one example, nonce 636 may be a resource consuming cryptographic puzzle. Blockchain controller 506 may evaluate nonce 636 to determine whether valid proof of work has been performed by miner 400 or another miner. In one example, nonce 636 may be a random number (e.g., a 32-bit number) and the proof of work may involve finding a hash below a target number.

Step 750 may include automatically tracking by the at least one processor any transactions associated with the lock by storing in a block associated with the blockchain encrypted values corresponding to the digital signature, an identifier associated with the device, and a result indicative of whether the current location of the at least one of the set of persons is substantially the same as the current location of the lock. As explained earlier with respect to FIG. 6B, blockchain controller 506 may perform this step by tracking transactions associated with a lock or a set of locks. Thus, step 750 may include blockchain controller 506 storing an encrypted value corresponding to the digital signature in the digital signature column of the transactions block (e.g., transactions 650 of FIG. 6B). Step 750 may further include blockchain controller 506 storing an encrypted value corresponding to the device ID in the device ID column of the transactions block. Step 750 may further include blockchain controller 506 storing an encrypted value corresponding to the result of the location check in a column associated with the transactions block (e.g., location check 659 of FIG. 6B). Although FIG. 7 shows a flow chart with a certain number of steps being performed in a certain order, the flow chart may include additional or fewer steps that may be performed in a different order.

In conclusion, in one example, the present disclosure relates to a method implemented by at least one processor. The method may include maintaining state information related to a lock in a memory associated with at least one processor, the lock configured to have a first state and a second state, where the first state of the lock corresponds to an open state of the lock and the second state corresponds to a locked state of the lock. The method may further include receiving by the at least one processor a current location of a device associated with at least one of a set of persons, authorized to change a state of the lock, attempting to change a state of the lock and a current location of the lock. The method may further include receiving by the at least one processor a digital signature from the device associated with the at least one of the set of persons authorized to change the state of the lock, where the digital signature comprises a shared private key that is shared among a set of devices associated with only the set of persons. The method may further include automatically transmitting by the at least one processor a control signal to the lock to change the state of the lock only when the current location of the at least one of the set of persons is determined to be substantially the same as the current location of the lock and a valid proof of work is performed by a miner associated with a blockchain configured to manage transactions corresponding to the lock. The method may further include automatically tracking by the at least one processor any transactions associated with the lock by storing in a block associated with the blockchain encrypted values corresponding to the digital signature, an identifier associated with the device, and a result indicative of whether the current location of the at least one of the set of persons is substantially the same as the current location of the lock.

The blockchain may include a plurality of blocks and where each of the plurality of blocks comprises a block header and at least one transaction entry associated with the lock.

The method may further include prior to automatically transmitting the control signal to at least one lock, requiring additional authorization information from the at least one set of persons attempting to change the state of the lock. The additional authorization information comprises biometric information associated with the at least one of the set of persons attempting to change the state of the lock. The method may further include storing an encrypted value corresponding to the at least one of the fingerprint, the face ID, the iris scan, the voice input, or the electrical property into the block associated with the blockchain.

The automatically tracking by the at least one processor may further comprise storing at least one of a lock identifier associated with the lock, a transaction identifier associated with a respective transaction, and a transaction type associated with the respective transaction in the block associated with the blockchain.

In another example, the present disclosure relates to a system comprising at least one processor and a memory. The system may further include the one or more modules stored in the memory and configured for execution by the at least one processor. The one or more modules may include instructions: (1) to maintain state information related to a lock in a memory associated with at least one processor, the lock configured to have a first state and a second state, where the first state of the lock corresponds to an open state of the lock and the second state corresponds to a locked state of the lock, (2) to receive a current location of a device associated with at least one of a set of persons, authorized to change a state of the lock, attempting to change a state of the lock and a current location of the lock, (3) to receive a digital signature from the device associated with the at least one of the set of persons authorized to change the state of the lock, where the digital signature comprises a shared private key that is shared among a set of devices associated with only the set of persons, (4) to automatically transmit a control signal to the lock to change the state of the lock only when the current location of the at least one of the set of persons is determined to be substantially the same as the current location of the lock and a valid proof of work is performed by a miner associated with a blockchain configured to manage transactions corresponding to the lock, and (5) to automatically track any transactions associated with the lock by storing in a block associated with the blockchain encrypted values corresponding to the digital signature, an identifier associated with the device, and a result indicative of whether the current location of the at least one of the set of persons is substantially the same as the current location of the lock.

The blockchain may include a plurality of blocks and where each of the plurality of blocks comprises a block header and at least one transaction entry associated with the lock.

The memory may further include instructions to prior to automatically transmitting the control signal to at least one lock, require additional authorization information from the at least one set of persons attempting to change the state of the lock. The additional authorization information comprises biometric information associated with the at least one of the set of persons attempting to change the state of the lock. The memory may further include instructions to store an encrypted value corresponding to the at least one of the fingerprint, the face ID, the iris scan, the voice input, or the electrical property associated with the at least one of the set of persons attempting to change the state of the lock in the block associated with the blockchain.

The memory may further include instructions to store at least one of a lock identifier associated with the lock, a transaction identifier associated with a respective transaction, and a transaction type associated with the respective transaction in the block associated with the blockchain.

In yet another example, the present disclosure relates to a non-transitory computer readable medium comprising instructions corresponding to a method implemented by at least one processor. The method may include maintaining state information related to a lock in a memory associated with at least one processor, the lock configured to have a first state and a second state, where the first state of the lock corresponds to an open state of the lock and the second state corresponds to a locked state of the lock. The method may further include receiving by the at least one processor a current location of a device associated with at least one of a set of persons, authorized to change a state of the lock, attempting to change a state of the lock and a current location of the lock. The method may further include receiving by the at least one processor a digital signature from the device associated with the at least one of the set of persons authorized to change the state of the lock, where the digital signature comprises a shared private key that is shared among a set of devices associated with only the set of persons. The method may further include automatically transmitting by the at least one processor a control signal to the lock to change the state of the lock only when the current location of the at least one of the set of persons is determined to be substantially the same as the current location of the lock and a valid proof of work is performed by a miner associated with a blockchain configured to manage transactions corresponding to the lock. The method may further include automatically tracking by the at least one processor any transactions associated with the lock by storing in a block associated with the blockchain encrypted values corresponding to the digital signature, an identifier associated with the device, and a result indicative of whether the current location of the at least one of the set of persons is substantially the same as the current location of the lock.

The blockchain may include a plurality of blocks and where each of the plurality of blocks comprises a block header and at least one transaction entry associated with the lock.

The method may further include prior to automatically transmitting the control signal to at least one lock, requiring additional authorization information from the at least one set of persons attempting to change the state of the lock. The additional authorization information comprises biometric information associated with the at least one of the set of persons attempting to change the state of the lock. The method may further include storing an encrypted value corresponding to the at least one of the fingerprint, the face ID, the iris scan, the voice input, or the electrical property into the block associated with the blockchain.

The automatically tracking by the at least one processor may further comprise storing at least one of a lock identifier associated with the lock, a transaction identifier associated with a respective transaction, and a transaction type associated with the respective transaction in the block associated with the blockchain.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A mobile device for locking or unlocking a lock configured to have a first state and a second state, wherein the first state of the lock corresponds to an open state and the second state of the lock corresponds to a locked state, the mobile device comprising:

a processor;

a memory; and instructions, stored in the memory, when executed by the processor, cause the mobile device:

to transmit a request to change a current state of the lock from a locked state to an unlocked state based on an exchange of information, via a wireless interface, between the mobile device and the lock, wherein the exchange of information includes a use of a shared digital key associated with at least one of a set of authorized persons allowed to change a state of the lock, wherein unlocking operates in a first mode and a second mode, wherein in the first mode, even if a measured value associated with a property of electromagnetic waves processed during an attempt to change the state of the lock meets at least one selected relationship between at least one predetermined criterion and the measured value associated with the property of processed electromagnetic waves, to change a state of the lock the mobile device requires identity-related information from a person attempting to change a state of the lock before transmitting the shared digital key to the lock, and wherein in the second mode, as long as the measured value associated with the property of the electromagnetic waves processed during an attempt to change the state of the lock meets the at least one selected relationship between the at least one predetermined criterion and the measured value associated with the property of processed electromagnetic waves, to change the state of the lock the mobile device transmits the shared digital key without requiring any identity-related information from the person attempting to change a state of the lock, wherein in both the first mode and the second mode, the mobile device selectively provides operational requirements associated with the transaction resulting in the changing of the state of the lock from the locked state of the lock to the unlocked state of the lock.

2. The mobile device of claim 1, wherein the memory further comprises instructions configured to provide an identifier associated with the mobile device to a database to allow tracking of transactions associated with the lock.

3. The mobile device of claim 2, wherein the identifier comprises an encrypted version of the identifier associated with the mobile device.

4. The mobile device of claim 1, wherein the memory further comprises instructions configured to provide an explicit request or an implicit request, via the mobile device, to change a current state of the lock from a closed state to an open state.

5. The mobile device of claim 1, wherein the identity-related information comprises at least one of a fingerprint, a face ID, an iris scan, a voice input, or an electrical property associated with the person attempting to change the state of the lock.

6. The mobile device of claim 5, wherein the memory further comprises instructions to store an encrypted value corresponding to the at least one of the fingerprint, the face ID, the iris scan, the voice input, or the electrical property associated with the at least one of the set of persons attempting to change the state of the lock.

7. The mobile device of claim 1, wherein the memory further comprises instructions configured to provide a location associated with the mobile device to allow a locking system associated with the lock to perform a location check including a comparison of a location of the lock and the location associated with the mobile device.

8. A method for operating a lock using a mobile device, wherein the lock is configured to have a locked state or an unlocked state, the method comprising:

transmitting a request to change a current state of the lock from a locked state to an unlocked state based on an exchange of information, via a wireless interface, between the mobile device and the lock, wherein the exchange of information includes a use of a shared digital key associated with at least one of a set of authorized persons allowed to change a state of the lock, wherein unlocking operates in a first mode and a second mode, and wherein in the first mode, even if a measured value associated with a property of electromagnetic waves processed during an attempt to change the state of the lock meets at least one selected relationship between at least one predetermined criterion and the measured value associated with the property of processed electromagnetic waves, to change a state of the lock the mobile device requires identity-related information from a person attempting to change a state of the lock before transmitting the shared digital key to the lock, and wherein in the second mode, as long as the measured value associated with the property of the electromagnetic waves processed during an attempt to change the state of the lock meets the at least one selected relationship between the at least one predetermined criterion and the measured value associated with the property of processed electromagnetic waves, to change the state of the lock the mobile device transmits the shared digital key without requiring any identity-related information from the person attempting to change a state of the lock, wherein in both the first mode and the second mode, the mobile device selectively providing operational requirements associated with the transaction resulting in the changing of the state of the lock from the locked state of the lock to the unlocked state of the lock; and allowing communication between the mobile device and a remote computing platform based on a designated storage mechanism access policy, wherein the remote computing platform is configurable to provide additional storage functionality to the mobile device regarding policies related to the lock.

9. The method of claim 8, further comprising the mobile device providing an identifier associated with the mobile device to a database to allow tracking of transactions associated with the lock.

10. The method of claim 9, wherein the identifier comprises an encrypted version of the identifier associated with the mobile device.

11. The method of claim 8, further comprising the mobile device providing an explicit request or an implicit request to change a current state of the lock from a locked to an unlocked state.

12. The method of claim 8, further comprising storing encrypted values corresponding to the shared digital key.

13. The method of claim 8, wherein the identity-related information comprises one of a fingerprint, a face ID, an iris scan, or a voice input.

14. The method of claim 8, further comprising storing an encrypted value corresponding to at least one of the fingerprint, the face ID, the iris scan, and the voice input.

15. The method of claim 8, further comprising providing a location associated with the mobile device to allow a locking system associated with the lock to perform a location check including a comparison of a location of the lock and the location associated with the mobile device.

16. A non-transitory computer-readable medium comprising instructions for operating a lock using a mobile device, wherein the lock is configured to have a locked state or an unlocked state, the method comprising:

transmitting a request to change a current state of the lock from a locked state to an unlocked state based on an exchange of information, via a wireless interface, between the mobile device and the lock, wherein the exchange of information includes a use of a shared digital key associated with at least one of a set of authorized persons allowed to change a state of the lock, wherein unlocking operates in a first mode and a second mode, wherein in the first mode, even if a measured value associated with a property of electromagnetic waves processed during an attempt to change the state of the lock meets at least one selected relationship between at least one predetermined criterion and the measured value associated with the property of processed electromagnetic waves, to change a state of the lock the mobile device requiring identity-related information from a person attempting to change a state of the lock before transmitting the shared digital key to the lock, and wherein in the second mode, as long as the measured value associated with the property of the electromagnetic waves processed during an attempt to change the state of the lock meets the at least one selected relationship between the at least one predetermined criterion and the measured value associated with the property of processed electromagnetic waves, to change the state of the lock the mobile device transmitting the shared digital key without requiring any identity-related information from the person attempting to change a state of the lock, wherein in both the first mode and the second mode, the mobile device selectively providing operational requirements associated with the transaction resulting in the changing of the state of the lock from the locked state of the lock to the unlocked state of the lock.

17. The non-transitory computer-readable medium of claim 16, wherein the method further comprising the mobile device providing an identifier associated with the mobile device to a database to allow tracking of transactions associated with the lock.

18. The non-transitory computer-readable medium of claim 16, wherein the method further comprising the mobile device providing an explicit request or an implicit request to change a current state of the lock from a locked to an unlocked state.

19. The non-transitory computer-readable medium of claim 16, wherein the identity-related information comprises one of a fingerprint, a face ID, an iris scan, or a voice input.

20. A non-transitory computer-readable medium comprising instructions for operating a lock using a mobile device, wherein the lock is configured to have a locked state or an unlocked state, the method comprising:

transmitting a request to change a current state of the lock from a locked state to an unlocked state based on an exchange of information, via a wireless interface, between the mobile device and the lock, wherein the exchange of information includes a use of a shared digital key associated with at least one of a set of authorized persons allowed to change a state of the lock, wherein unlocking operates in a first mode and a second mode, wherein in the first mode, even if a measured value associated with a property of electromagnetic waves processed during an attempt to change the state of the lock meets at least one selected relationship between at least one predetermined criterion and the measured value associated with the property of processed electromagnetic waves, to change a state of the lock the mobile device requiring identity-related information from a person attempting to change a state of the lock before transmitting the shared digital key to the lock, wherein the identity-related information comprises one of a fingerprint, a face ID, an iris scan, or a voice input, and wherein in the second mode, as long as the measured value associated with the property of the electromagnetic waves processed during an attempt to change the state of the lock meets the at least one selected relationship between the at least one predetermined criterion and the measured value associated with the property of processed electromagnetic waves, to change the state of the lock the mobile device transmitting the shared digital key without requiring any identity-related information from the person attempting to change a state of the lock, wherein in both the first mode and the second mode, the mobile device provides a location associated with the mobile device to allow a locking system associated with the lock to perform a location check including a comparison of a location of the lock and the location associated with the mobile device.

21. The non-transitory computer-readable medium of claim 20, wherein the method further comprising the mobile device providing an identifier associated with the mobile device to a database to allow tracking of transactions associated with the lock.

22. The non-transitory computer-readable medium of claim 21, wherein the method further comprising the mobile device providing an explicit request or an implicit request to change a current state of the lock from a locked to an unlocked state.

* * * * *